US012088218B2

(12) United States Patent
Kwon et al.

(10) Patent No.: US 12,088,218 B2
(45) Date of Patent: Sep. 10, 2024

(54) ENERGY HARVESTER

(71) Applicants: HYUNDAI MOTOR COMPANY, Seoul (KR); KIA CORPORATION, Seoul (KR)

(72) Inventors: Dae Sung Kwon, Seoul (KR); Il Seon Yoo, Suwon-si (KR); Jang Hyeon Lee, Gunpo-si (KR); Dong Gu Kim, Suwon-si (KR); Hyun Soo Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 79 days.

(21) Appl. No.: 18/075,955

(22) Filed: Dec. 6, 2022

(65) Prior Publication Data
US 2024/0014752 A1 Jan. 11, 2024

(30) Foreign Application Priority Data
Jul. 8, 2022 (KR) .................. 10-2022-0084548

(51) Int. Cl.
*H02N 1/04* (2006.01)
(52) U.S. Cl.
CPC ..................... *H02N 1/04* (2013.01)
(58) Field of Classification Search
CPC ...................................................... H02N 1/04
(Continued)

(56) References Cited

U.S. PATENT DOCUMENTS 9,728,707 B2 * 8/2017 Vaeth ................. H10N 30/8554
2007/0114890 A1 * 5/2007 Churchill ............ H10N 30/306
310/339
(Continued)

FOREIGN PATENT DOCUMENTS

JP 2010-154746 A 7/2010
JP 2012-182187 A 9/2012
(Continued)

OTHER PUBLICATIONS

Divij Bhatia et al., "Continuous scavenging of broadband vibrations via omnipotent tandem triboelectric nanogenerators with cascade impact structure", Scientific Reports, 9, 8223 (2019).
(Continued)

*Primary Examiner* — Ahmed Elnakib
(74) *Attorney, Agent, or Firm* — McDonnell Boehnen Hulbert & Berghoff LLP

(57) ABSTRACT

An energy harvester includes an electrode part including a plurality of partition walls spaced apart from one another in a horizontal direction, and spaces defined between the plurality of partition walls, and a cantilever part including a cantilever member having at least a partial region provided in the space defined in the electrode part, the cantilever member includes a plurality of cantilever members, each of the plurality of cantilever members having a first end and a second end, wherein the first end is positioned in the space defined in the electrode part, and wherein the second end is fixedly coupled to a housing, and in which a natural frequency of at least one of the plurality of cantilever members is different from a natural frequency of each of the remaining cantilever members.

19 Claims, 7 Drawing Sheets

(58) Field of Classification Search
USPC .................................................. 310/309, 310
See application file for complete search history.

(56) References Cited

U.S. PATENT DOCUMENTS

| | | | |
|---|---|---|---|
| 2008/0136292 A1 | 6/2008 | Thiesen | |
| 2012/0212101 A1 | 8/2012 | Tabata et al. | |
| 2015/0035409 A1* | 2/2015 | Procopio | H02N 2/188 |
| | | | 310/319 |
| 2015/0222204 A1* | 8/2015 | Abou-Nasr | B60C 23/0493 |
| | | | 310/309 |
| 2023/0064609 A1* | 3/2023 | Zhang | H02N 1/04 |
| 2024/0014752 A1* | 1/2024 | Kwon | H02N 1/04 |
| 2024/0022184 A1* | 1/2024 | Kwon | H02N 1/04 |
| 2024/0048077 A1* | 2/2024 | Kwon | H02N 11/002 |

FOREIGN PATENT DOCUMENTS

| | | |
|---|---|---|
| KR | 2010-0125090 A | 11/2010 |
| KR | 2016-0122712 A | 10/2016 |
| KR | 10-1951031 B1 | 2/2019 |
| KR | 2021-0125794 A | 10/2021 |

OTHER PUBLICATIONS

Guang Zhu et al., "Linear-Grating Triboelectric Generator Based on Sliding Electrification", Nano Letters, 13, 2282-2289 (2013).
Simiao Niu et al., "Theoretical systems of triboelectric nanogenerators", Nano Energy, 14, 161-192 (2015).
Yannan Xie et al., "Grating-Structured Freestanding Triboelectric-Layer Nanogenerator for Harvesting Mechanical Energy at 85% Total Conversion Efficiency", Adv. Mater, 26, 6599-6607 (2014).
Long Lin et al., "Segmentally Structured Disk Triboelectric Nanogenerator for Harvesting Rotational Mechanical Energy", Nano Letters, 13, 2916 (2013).
Lun Pan et al., "Liquid-FEP-based U-tube triboelectric nanogenerator for harvesting water-wave energy", Nano Research, 11, 4062-4073 (2018).
Jun Chen et al., "Harmonic-Resonator-Based Triboelectric Nanogenerator as a Sustainable Power Source and a Self-Powered Active Vibration Sensor", Adv. Mater, 25, 6094-6099 (2013).
Guang Zhu et al., "Triboelectric-Generator-Driven Pulse Electrodeposition for Micropatterning", Nano Letters, 12, 4960-4965 (2012).

* cited by examiner

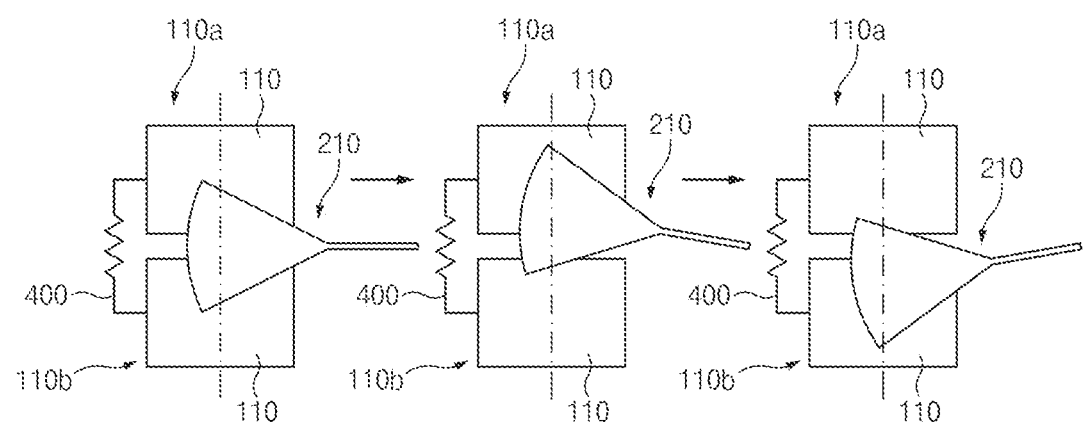
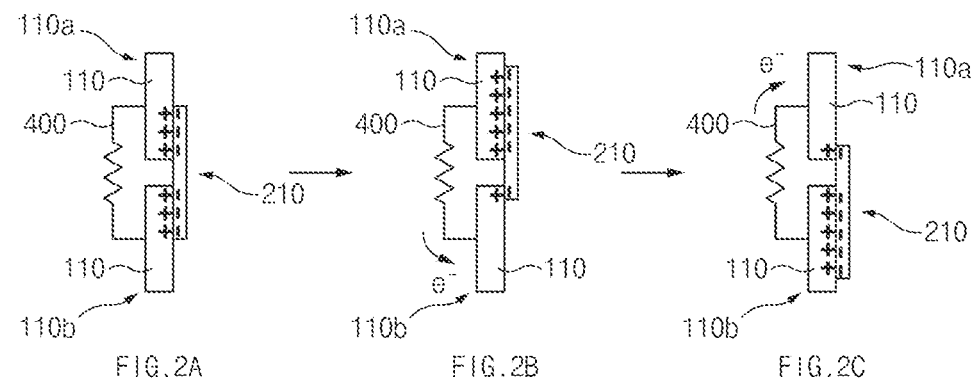
FIG. 2A  FIG. 2B  FIG. 2C

ENERGY HARVESTER

CROSS REFERENCE TO RELATED APPLICATIONS

This application claims priority to and the benefit of Korean Patent Application No. 10-2022-0084548 filed in the Korean Intellectual Property Office on Jul. 8, 2022, the entire contents of which are incorporated herein by reference.

TECHNICAL FIELD

The present disclosure relates to an energy harvester, and more particularly, to an energy harvester capable of converting vibration, which is applied from the outside, into electrical energy.

BACKGROUND

An energy harvester refers to a device that converts external vibration or kinetic energy generated by impact into electrical energy. For example, a triboelectric energy harvester refers to a device that converts kinetic energy into electrical energy by using a triboelectric effect and electrostatic induction. The triboelectric energy harvester refers to a device that produces electrical energy by using electron transfer between different friction surfaces implemented by a difference in electronegativity when the friction surfaces come into contact with one another or using electron transfer implemented by a change in electric field when a relative motion occurs between friction surfaces having surface charges. The above-mentioned type of energy harvester is a device that produces electric current by using a relative motion between two different interfaces. Therefore, the energy harvester has a wide range of application because the energy harvester may produce electrical energy directly from mechanical kinetic energy and because the energy harvester may produce electrical energy not only in a case in which the two interfaces are solids but also in a case in which the two interfaces are liquids or a solid and a liquid, respectively.

Depending on operating methods, modes of the triboelectric energy harvester are broadly classified into i) a vertical contact-separation mode that allows two interfaces to be periodically brought into contact with each other and separated from each other by vertical motions of the interfaces, and ii) a lateral sliding mode that allows two interfaces to be slid relative to each other by horizontal motions of the two interfaces.

Meanwhile, in the related art, components having various sizes or mass need to be mounted in the energy harvester to convert vibrational energy, which has various types of frequencies applied from the outside, into electrical energy, which inevitably causes a significant increase in volume. Accordingly, there is an increasing need for an energy harvester having a small volume and being capable of converting vibrational energy having various types of frequencies into electrical energy.

SUMMARY

The present disclosure has been made in an effort to provide an energy harvester having a small volume and being capable of converting vibrational energy having various types of frequencies into electrical energy.

An embodiment of the present disclosure provides an energy harvester including an electrode part including a plurality of partition walls spaced apart from one another in a horizontal direction, and spaces defined between the plurality of partition walls, and a cantilever part including a cantilever member having at least a partial region provided in the space defined in the electrode part, in which the cantilever member includes a plurality of cantilever members, each of the plurality of cantilever members having a first end and a second end, wherein the first end is positioned in the space defined in the electrode part, and wherein the second end is fixedly coupled to a housing, and in which a natural frequency of at least one of the plurality of cantilever members is different from a natural frequency of each of the remaining cantilever members.

An area of one of the plurality of cantilever members may be different from an area of each of the remaining cantilever members.

The cantilever member may include an extension region having one fixed end and extending in a direction from one end toward the electrode part, and an expansion region extending toward the electrode part from the other end of the extension region opposite to one end of the extension region, and the expansion region may include an increasing section having a height in a vertical direction H that increases in a direction away from the extension region.

The expansion region may have an arc shape having a predetermined central angle $\theta$ defined about a point connected to the other end of the extension region.

The expansion region may have an isosceles triangular shape having a vertex angle $\theta'$ defined at the other end of the extension region.

The expansion region may have a shape horizontally symmetric with respect to an axis extending in a longitudinal direction of the extension region.

A size of the central angle $\theta$ formed in the expansion region of at least one of the plurality of cantilever members may be different from a size of the central angle $\theta$ formed in the expansion region of each of the remaining cantilever members.

A size of the vertex angle $\theta'$ formed in the expansion region of at least one of the plurality of cantilever members may be different from a size of the vertex angle $\theta'$ formed in the expansion region of each of the remaining cantilever members.

The plurality of cantilever members may be respectively accommodated between the plurality of partition walls of the electrode part, and a size of the central angle of any one of the plurality of cantilever members may be larger than a size of the central angle of another cantilever member spaced apart from one cantilever member in one direction of two opposite directions in which the plurality of partition walls is spaced apart from one another.

The plurality of cantilever members may be respectively accommodated between the plurality of partition walls of the electrode part, and a size of the vertex angle $\theta'$ of any one of the plurality of cantilever members may be larger than a size of the vertex angle $\theta'$ of another cantilever member spaced apart from one cantilever member in one direction of two opposite directions in which the plurality of partition walls is spaced apart from one another.

The extension regions of the plurality of cantilever members may be identical in size and shape to one another.

The electrode part may include a first electrode part including the plurality of partition walls and the spaces defined between the plurality of partition walls, and a second electrode part provided below the first electrode part and including the plurality of partition walls and the spaces defined between the plurality of partition walls, one partial region of each of the plurality of cantilever members may be provided in the space defined in the first electrode part, and another partial region of each of the plurality of cantilever members may be provided in the space defined in the second electrode part.

The first and second electrode parts may be identical in size and shape to each other.

At least some of the plurality of cantilever members may be spaced apart from the partition walls in two opposite directions in which the plurality of partition walls is spaced apart from one another.

The energy harvester may further include a brush region provided in a space between the cantilever member and the partition wall, in which one side of the brush region is in contact with the cantilever member, and the other side of the brush region is in contact with the partition wall.

A surface of the partition wall facing the cantilever member and a surface of the cantilever member facing the partition wall may be parallel to each other.

A surface of the partition wall facing the cantilever member and a surface of the cantilever member facing the partition wall may have a predetermined angle.

The energy harvester may further include an electric wire member configured to connect the first and second electrode parts.

Electronegativity of the brush region may be higher than electronegativity of the partition wall.

According to the present disclosure, it is possible to provide the energy harvester having a small volume and being capable of converting vibrational energy having various types of frequencies into electrical energy.

BRIEF DESCRIPTION OF THE FIGURES

FIGS. 2A, 2B, and 2C are views illustrating, in a time series manner, a process in which a relative motion occurs between an electrode part and a cantilever part and thus electric current is generated in the energy harvester according to the present disclosure.

DETAILED DESCRIPTION

Hereinafter, an energy harvester according to the present disclosure will be described with reference to the drawings.

Figure 1:
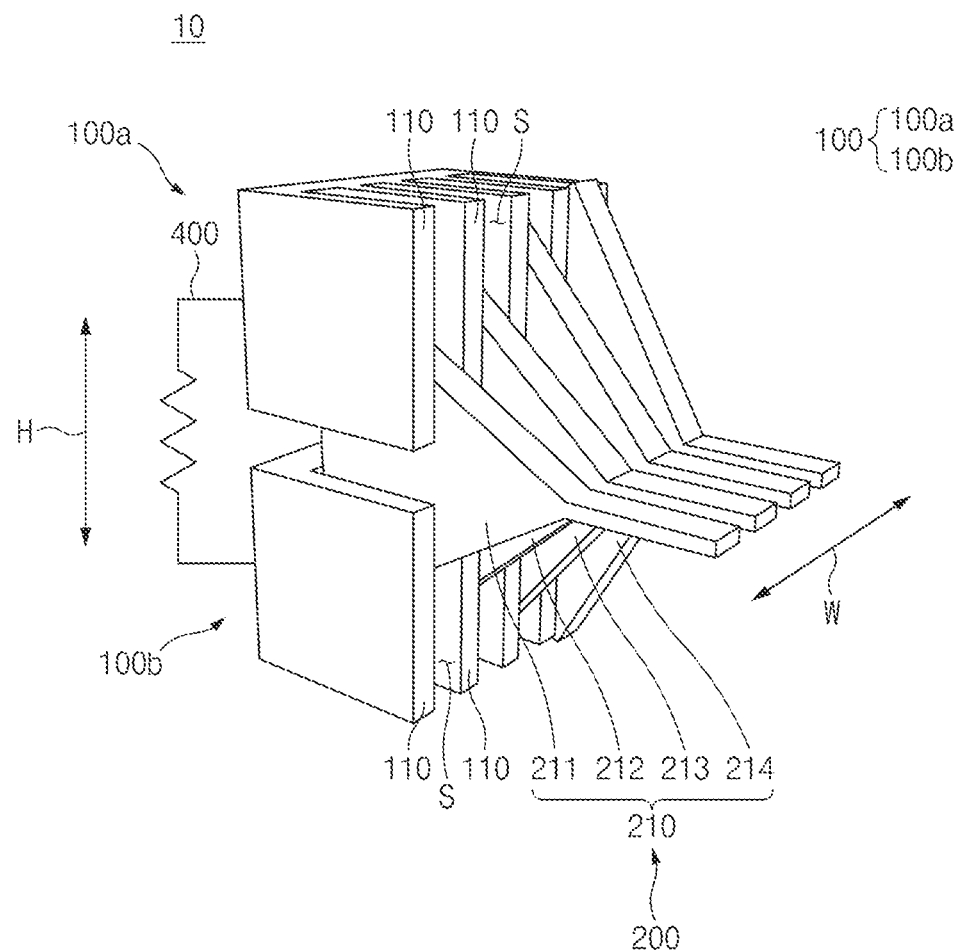
FIG. 1 is a perspective view illustrating an energy harvester according to the present disclosure.
Figure 3:
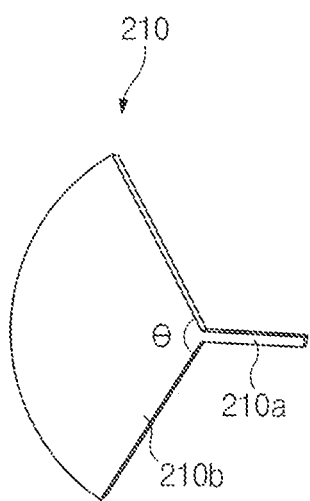
FIG. 3 is a top plan view illustrating an example of a cantilever member provided in the energy harvester according to the present disclosure.
Figure 4:
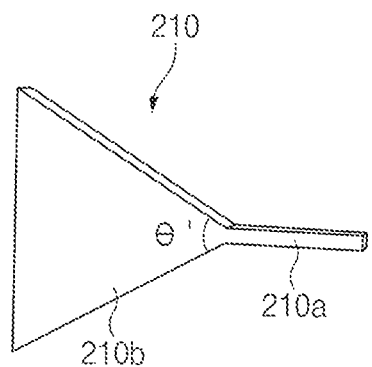
FIG. 4 is a top plan view illustrating another example of the cantilever member provided in the energy harvester according to the present disclosure.

FIG. 1 is a perspective view illustrating an energy harvester according to the present disclosure, and FIG. 2 is a view illustrating, in a time series manner, a process in which a relative motion occurs between an electrode part and a cantilever part and thus electric current is generated in the energy harvester according to the present disclosure. FIG. 3 is a top plan view illustrating an example of a cantilever member provided in the energy harvester according to the present disclosure, and FIG. 4 is a top plan view illustrating another example of the cantilever member provided in the energy harvester according to the present disclosure.

An energy harvester 10 according to the present disclosure may be a device for converting kinetic energy into electrical energy by using a triboelectric effect and electrostatic induction. More specifically, in the related art, the energy harvester refers to a device that produces electrical energy by using electron transfer between different friction surfaces implemented by a difference in electronegativity between the friction surfaces when the friction surfaces come into contact with one another or using electron transfer implemented by a change in electric field when a relative motion occurs between friction surfaces having surface charges.

The energy harvester 10 according to the present disclosure may be fixedly coupled to another device that vibrates during an operating process. For example, the energy harvester 10 may be provided in mobility devices including vehicles. In this case, the energy harvester 10 may convert vibrational energy, which is generated while the mobility such as the vehicle travels, into electrical energy. However, the energy harvester 10 according to the present disclosure may be mounted in other components that vibrate during operating processes.

In addition, as described below, the energy harvester 10 according to the present disclosure may effectively harvest electrical energy from vibration having frequencies with various bands.

Referring to FIG. 1, the energy harvester 10 may include an electrode part 100 including a plurality of partition walls 110 spaced apart from one another in a horizontal direction W, and spaces S defined between the plurality of partition walls 110; and a cantilever part 200 including cantilever members 210 each having at least a partial region provided in each of the spaces S defined in the electrode part 100.

As illustrated in FIGS. 2A-2C, according to the present disclosure, electrical energy may be generated by relative motions between the electrode part 100 and the cantilever part 200 (i.e., the cantilever members 210). More specifically, when vibration is applied from the outside, the distribution of charges on the electrode part 100 and the cantilever members 210 may be changed by the relative motions between the electrode part 100 and the cantilever members 210 over time, and electric current may be generated as the charges move to correspond to the change in the distribution of charges.

Referring again to FIG. 1, the electrode part 100 may include a first electrode part 100a including the plurality of partition walls 110 and the spaces S defined between the plurality of partition walls 110, and a second electrode part 100b provided below the first electrode part 100a and including the plurality of partition walls 110 and the spaces S defined between the plurality of partition walls 110. In this case, one partial region of each of the plurality of cantilever members 210 of the cantilever part 200 may be provided in each of the spaces S defined in the first electrode part 100a, and another partial region of each of the plurality of cantilever members 210 may be provided in each of the spaces S defined in the second electrode part 100b. For example, FIG. 1 illustrates that five partition walls 110 are provided in the first electrode part 100a, five partition walls 110 are provided in the second electrode part 100b, and spaces are formed between the five partition walls 110, such that the first electrode part 100a has four spaces S, the second electrode part 100b has four spaces S, and four cantilever members 210 of the cantilever part 200 are respectively provided in the four spaces S of the first electrode part 100a and the four spaces S of the second electrode part 100b in a one-to-one manner. In the case in which the cantilever part 200 has the four cantilever members 210 in the present specification, the four cantilever members 210 include a first cantilever member 211, a second cantilever member 212, a third cantilever member 213, and a fourth cantilever member 214 disposed in one direction of the horizontal direction W. However, the number of spaces S defined in the electrode part 100 and the number of cantilever members 210 are not limited to those illustrated in the drawings.

As described above, a plurality of cantilever members 210 may be provided. More specifically, the energy harvester 10 according to the present disclosure may be configured to produce electrical energy from vibration having frequencies with various bands applied from the outside.

To achieve the above-mentioned object, according to the present disclosure, the other end of two opposite ends of the cantilever member 210, which is opposite to one end of the cantilever member 210 that is formed in a region accommodated in the space S defined in the electrode part 100, may be fixedly coupled to a housing to be described below. A natural frequency of at least one of the plurality of cantilever members 210 may be different from a natural frequency of each of the remaining cantilever members 210. More particularly, natural frequencies of the plurality of cantilever members 210 of the cantilever part 200 may be different from one another.

Therefore, according to the present disclosure, the energy harvester 10 may convert vibrational energy having frequencies with various bands applied from the outside into electrical energy. That is, according to the present disclosure, because the cantilever members 210 of the cantilever part 200 have two or more natural frequencies, the energy harvester 10 may efficiently produce electrical energy from vibration having two or more frequencies. For example, when a natural frequency of one of the plurality of cantilever members is A and a natural frequency of another cantilever member is B, the energy harvester may produce electrical energy not only from external vibration having a frequency with a value of A but also from external vibration having a frequency with a value of B. Meanwhile, when vibration is applied from the outside, the cantilever member 210 may vibrate in a vertical direction H based on FIG. 1.

Meanwhile, according to an example of the present disclosure, the plurality of cantilever members 210 may be made of the same material. The plurality of cantilever members 210 may have the same thickness in the horizontal direction W. However, an area of one of the plurality of cantilever members 210 may be different from an area of each of the remaining cantilever members 210 so that the natural frequencies of some of the plurality of cantilever members 210 may be different from the natural frequencies of the other cantilever members 210. In this case, a cross-sectional area, which is made by cutting the cantilever member 210 in a direction parallel to an imaginary plane perpendicular to the horizontal direction W may be defined as the area of the cantilever member 210.

Hereinafter, a shape of the cantilever member will be described in detail.

Referring to FIGS. 3 and 4, the cantilever member 210 may include an extension region 210a having one end fixed to an external component, the extension region 210a extending from one end thereof in a direction toward the electrode part 100 (see FIG. 1), and an expansion region 210b extending toward the electrode part 100 (see FIG. 1) from the other end of the extension region 210a opposite to one end of the extension region 210a.

In this case, a height of the expansion region 210b in the vertical direction H may be larger than a height of the extension region 210a in the vertical direction H. More specifically, as illustrated in FIGS. 3 and 4, the expansion region 210b may include an increasing section having the height in the vertical direction H that increases in a direction away from the extension region 210a.

For example, as illustrated in FIG. 3, the expansion region 210b may have an arc shape having a predetermined central angle θ defined about a point connected to the other end of the extension region 210a. In this case, the expansion region 210b may include the increasing section connected to the extension region 210a and having a height in the vertical direction H that increases in the direction away from the extension region 210a; and a decreasing section connected to the increasing section and having a height in the vertical direction H that decreases in the direction away from the extension region 210a.

In contrast, as another example, as illustrated in FIG. 4, the expansion region 210b may have an isosceles triangular shape having a vertex angle θ' defined at the other end of the extension region 210a. In this case, the expansion region 210b may include only the increasing section connected to the extension region 210a and having the height in the vertical direction H that increases in the direction away from the extension region 210a.

Meanwhile, the expansion region 210b may have a horizontally symmetric shape with respect to an axis extending in a longitudinal direction of the extension region 210a. The first and second electrode parts 100a and 100b may also have a horizontally symmetric shape with respect to the axis. It can be understood that the first and second electrode parts 100a and 100b are identical in size and shape to each other. In this case, when the cantilever member 210 vibrates in the vertical direction because of external vibration, the charges for generating electric current may be symmetrically transferred.

Meanwhile, as described above, according to the present disclosure, an area of at least one of the plurality of cantilever members 210 may be different from an area of each of the remaining cantilever members 210.

In this case, according to an example of the present disclosure in which the expansion region 210b has an arc shape, a size of the central angle θ of the expansion region 210b of at least one of the plurality of cantilever members 210 may be different from a size of the central angle θ of the expansion region 210b of each of the remaining cantilever members 210. In particular, referring to FIGS. 1 and 3, the plurality of cantilever members 210 may be respectively accommodated between the plurality of partition walls 110 of the electrode part 100. A size of the central angle θ of any one of the plurality of cantilever members 210 may be larger than a size of the central angle θ of another cantilever member spaced apart from one cantilever member in one direction of the two opposite directions (i.e., the horizontal direction W) in which the plurality of partition walls 110 is spaced apart from one another. It can be understood that the central angle of the second cantilever member 212 is larger than the central angle of the first cantilever member 211, the central angle of the third cantilever member 213 is larger than the central angle of the second cantilever member 212, and the central angle of the fourth cantilever member 214 is larger than the central angle of the third cantilever member 213.

In contrast, according to another example of the present disclosure in which the expansion region 210b has an isosceles triangular shape, a size of the vertex angle θ' formed in the expansion region 210b of at least one of the plurality of cantilever members 210 may be different from a size of the vertex angle θ' formed in the expansion region 210b of each of the remaining cantilever members 210. In particular, referring to FIGS. 1 and 4, the plurality of cantilever members 210 may be respectively accommodated between the plurality of partition walls 110 of the electrode part 100. A size of the vertex angle θ' of the cantilever member 210 of any one of the plurality of cantilever members 210 may be larger than a size of the vertex angle of another cantilever member 210 spaced apart from one cantilever member 210 in one direction of the two opposite directions (i.e., the horizontal direction W) in which the plurality of partition walls is spaced apart from one another. It can be understood that the vertex angle of the second cantilever member 212 is larger than the vertex angle of the first cantilever member 211, the vertex angle of the third cantilever member 213 is larger than the vertex angle of the second cantilever member 212, and the vertex angle of the fourth cantilever member 214 is larger than the vertex angle of the third cantilever member 213.

Meanwhile, the extension regions 210a of the plurality of cantilever members 210 of the cantilever part 200 may be identical in size and shape to one another. Alternatively, the extension regions 210a of the plurality of cantilever members 210 may be different in size and shape from one another.

Figure 5:
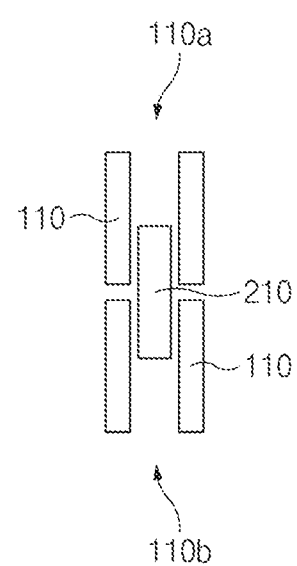
FIG. 5 is a view illustrating a first example of a cross-sectional structure of the cantilever member and a partition wall of the electrode part in the energy harvester according to the present disclosure.
Figure 6:
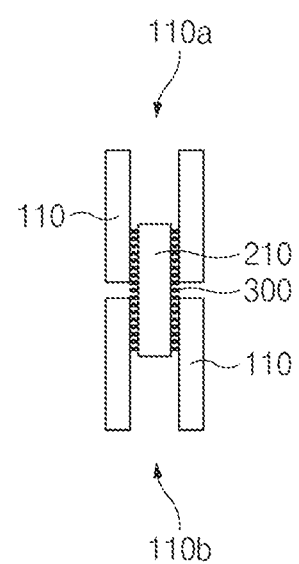
FIG. 6 is a view illustrating a second example of the cross-sectional structure of the cantilever member and the partition wall of the electrode part in the energy harvester according to the present disclosure.
Figure 7:
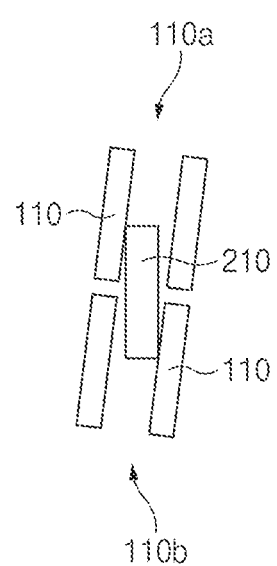
FIG. 7 is a view illustrating a third example of the cross-sectional structure of the cantilever member and the partition wall of the electrode part in the energy harvester according to the present disclosure.

FIG. 5 is a view illustrating a first example of a cross-sectional structure of the cantilever member and the partition wall of the electrode part in the energy harvester according to the present disclosure, and FIG. 6 is a view illustrating a second example of the cross-sectional structure of the cantilever member and the partition wall of the electrode part in the energy harvester according to the present disclosure. FIG. 7 is a view illustrating a third example of the cross-sectional structure of the cantilever member and the partition wall of the electrode part in the energy harvester according to the present disclosure.

As illustrated in FIG. 5, according to the first example, at least some of the plurality of cantilever members 210 may be spaced apart from the partition walls 110 in the two opposite directions in which the plurality of partition walls 110 is spaced apart from one another. At least some of the plurality of cantilever members 210 may be provided in parallel with the plurality of partition walls 110. More particularly, according to the first example, the plurality of cantilever members 210 of the cantilever part 200 may be spaced apart from the partition walls 110 and provided in parallel with the partition walls 110. In this case, the cantilever members 210 may always be kept spaced apart from the partition walls 110 in a situation in which the plurality of cantilever members 210 vibrates in the vertical direction.

Meanwhile, as illustrated in FIG. 6, according to the second example, the energy harvester 10 may further include brush regions 300 provided in the spaces between the cantilever members 210 and the partition walls 110. One side of the brush region 300 may be in contact with the cantilever member 210, and the other side of the brush region 300 may be in contact with the partition wall 110. In this case, the term 'contact' may be understood as a concept including the configuration in which two components are joined to each other. Therefore, when the brush region 300 is joined to the cantilever member 210, a slip may occur between the brush region 300 and the partition wall 110 because of a relative motion implemented by vibration of the cantilever member 210. On the contrary, when the brush region 300 is joined to the partition wall 110, a slip may occur between the brush region 300 and the cantilever member 210 because of a relative motion implemented by vibration of the cantilever member 210.

As illustrated in FIG. 2, during a process in which the partition wall 110 of the electrode part 100 and the cantilever member 210 are electrically charged, the partition wall 110 of the electrode part may have positive charges, and the cantilever member 210 may have negative charges. Therefore, the brush region 300 may contain a material having relatively high electronegativity so that the charges may move from the partition wall 110 to the cantilever member 210 through the brush region 300 during an electrification process. More particularly, the electronegativity of the brush region 300 may be higher than the electronegativity of the partition wall 110. For example, the brush region 300 may contain a material such as nylon or Teflon or be made of the material.

Meanwhile, as illustrated in FIGS. 5 and 6, according to the first and second examples, a surface of the partition wall 110 facing the cantilever member 210 and a surface of the cantilever member 210 facing the partition wall 110 may be spaced apart from each other and provided in parallel with each other. Therefore, according to the first and second examples, the cantilever member 210 and the partition wall 110 do not come into contact with each other during a process in which the cantilever member 210 is vibrated by external vibration.

However, as illustrated in FIG. 7, according to the third example, the cantilever member 210 and the partition wall 110 may come into contact with each other during a process in which the cantilever member 210 is vibrated by external vibration. More specifically, according to the third example, a surface of the partition wall 110 facing the cantilever member 210 and a surface of the cantilever member 210 facing the partition wall 110 may have a predetermined angle. Therefore, according to the third example, when the cantilever member 210 vibrates while deviating from a predetermined range, the cantilever member 210 may come into contact with the partition wall 110. As in the third example, when the cantilever member 210 is provided to be able to come into contact with the partition wall 110, the efficiency in producing electrical energy may be further improved.

Meanwhile, referring to FIG. 1, the energy harvester 10 may further include an electric wire member 400 configured to connect the first electrode part 100a and the second electrode part 100b. The electric wire member 400 may be configured to provide a route through which the charges are transferred between the first electrode part 100a and the second electrode part 100b.

Meanwhile, although not illustrated in the drawings, the energy harvester 10 may further include the housing that accommodates the electrode part 100, the cantilever part 200, the electric wire member 400, and the like. More specifically, the electrode part 100 including the first and second electrode parts 100a and 100b may be fixedly coupled to the housing, and one end of each of the extension regions 210a of the cantilever part 200 may be fixedly coupled to the housing. The housing may be mounted in the component (e.g., the vehicle) intended to produce electric power by using the energy harvester.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

The invention claimed is:

1. An energy harvester comprising:
   an electrode part comprising a plurality of partition walls each partition wall being spaced apart in a horizontal direction by a plurality of spaces; and
   a cantilever part comprising a cantilever member having at least a partial region provided in each of the plurality of spaces;
   wherein the cantilever member includes a plurality of cantilever members, each of the plurality of cantilever members having a first end and a second end, wherein the first end is positioned in each of the plurality of spaces defined in the electrode part, and wherein the second end is fixedly coupled to a housing; and
   wherein a natural frequency of at least one of the plurality of cantilever members is different from a natural frequency of each of the remaining plurality of cantilever members.

2. The energy harvester of claim 1, wherein an area of one of the plurality of cantilever members is different from an area of each of the remaining plurality of cantilever members.

3. The energy harvester of claim 1, wherein each cantilever member comprises:
   an extension region having one fixed end and extending in a direction from the one fixed end toward the electrode part; and
   an expansion region extending toward the electrode part from an other end of the extension region opposite to the one fixed end of the extension region; and
   wherein the expansion region comprises an increasing section having a height in a vertical direction that increases in a direction away from the extension region.

4. The energy harvester of claim 3, wherein the expansion region has an arc shape having a predetermined central angle defined about a point connected to the other end of the extension region.

5. The energy harvester of claim 4, wherein a size of the central angle formed in the expansion region of at least one of the plurality of cantilever members is different from a size of the central angle formed in the expansion region of each of the remaining plurality of cantilever members.

6. The energy harvester of claim 5, wherein each one of the plurality of cantilever members is positioned between each of the plurality of partition walls of the electrode part; and
   wherein a size of the central angle of one of the plurality of cantilever members is larger than a size of the central angle of a second cantilever member spaced apart from the one cantilever member in one of two opposite directions in which the plurality of partition walls is spaced apart from one another.

7. The energy harvester of claim 3, wherein the expansion region has an isosceles triangular shape having a vertex angle defined at the other end of the extension region.

8. The energy harvester of claim 7, wherein a size of the vertex angle formed in the expansion region of at least one of the plurality of cantilever members is different from a size of the vertex angle formed in the expansion region of each of the remaining plurality of cantilever members.

9. The energy harvester of claim 8, wherein each of the plurality of cantilever members is positioned between each of the plurality of partition walls of the electrode part; and
   wherein a size of the vertex angle of one of the plurality of cantilever members is larger than a size of the vertex angle of a second cantilever member spaced apart from the one cantilever member in one of two opposite directions in which the plurality of partition walls is spaced apart from one another.

10. The energy harvester of claim 3, wherein the expansion region has a shape horizontally symmetric with respect to an axis extending in a longitudinal direction of the extension region.

11. The energy harvester of claim 3, wherein the extension regions of the plurality of cantilever members are identical in size and shape to one another.

12. The energy harvester of claim 1, wherein the electrode part comprises:
   a first electrode part comprising the plurality of partition walls and the plurality of spaces defined between the plurality of partition walls; and
   a second electrode part provided below the first electrode part and comprising the plurality of partition walls and the plurality of spaces defined between the plurality of partition walls; and
   wherein one partial region of each of the plurality of cantilever members is positioned in the space defined in the first electrode part, and another partial region of each of the plurality of cantilever members is positioned in the space defined in the second electrode part.

13. The energy harvester of claim 12, wherein the first and second electrode parts are identical in size and shape to each other.

14. The energy harvester of claim 12, further comprising:
   an electric wire member configured to connect the first and second electrode parts.

15. The energy harvester of claim 1, wherein at least some of the plurality of cantilever members are spaced apart from the plurality of partition walls in two opposite directions in which the plurality of partition walls is spaced apart from one another.

16. The energy harvester of claim 1, further comprising:
   a brush region provided in a space between each of the plurality of cantilever members and the partition wall;
   wherein one side of the brush region is in contact with each of the plurality of cantilever members, and the other side of the brush region is in contact with each of the plurality of partition walls.

17. The energy harvester of claim 16, wherein electronegativity of the brush region is higher than electronegativity of each of the plurality of partition walls.

18. The energy harvester of claim 1, wherein a surface of the partition wall facing each of the plurality of cantilever members and a surface of each of the plurality of cantilever members facing each of the plurality of partition walls are parallel to each other.

19. The energy harvester of claim 1, wherein a surface of the partition wall facing each of the plurality of cantilever members and a surface of each of the plurality of cantilever members facing each of the plurality of partition walls have a predetermined angle.

\* \* \* \* \*